United States Patent [19]

Froelich

[11] Patent Number: 4,829,166
[45] Date of Patent: May 9, 1989

[54] COMPUTERIZED DATA-BEARING CARD AND READER/WRITER THEREFOR

[76] Inventor: Ronald W. Froelich, 2405 N. Cameron Ave., Covina, Calif. 91724

[21] Appl. No.: 85,419

[22] Filed: Aug. 13, 1987

Related U.S. Application Data

[63] Continuation-in-part of Ser. No. 936,118, Dec. 1, 1986, abandoned.

[51] Int. Cl.⁴ .............................................. G06F 15/30
[52] U.S. Cl. ..................................... 235/379; 235/492; 340/825.34; 902/4
[58] Field of Search ...................... 235/379, 492, 380; 340/825.33, 825.34; 902/4, 24, 25, 26

[56] References Cited

U.S. PATENT DOCUMENTS

| | | | |
|---|---|---|---|
| 3,584,928 | 6/1971 | Robrock, II | 315/169 |
| 3,593,292 | 7/1971 | Scott | 340/149 A |
| 3,805,255 | 4/1974 | Baker | 340/172.5 |
| 4,242,576 | 12/1980 | Lundgren | 285/435 |
| 4,298,793 | 11/1981 | Melis et al. | 235/487 |
| 4,384,288 | 5/1983 | Walton | 340/825.34 |
| 4,454,414 | 6/1984 | Benton | 235/380 |
| 4,473,825 | 9/1984 | Walton | 340/825.54 |
| 4,523,297 | 6/1985 | Ugon | 235/380 |
| 4,529,870 | 7/1985 | Chaum | 235/380 |
| 4,538,056 | 8/1985 | Young | 235/380 |
| 4,549,075 | 10/1985 | Saada et al. | 235/380 |
| 4,575,621 | 3/1986 | Dreifus | 235/492 |
| 4,582,985 | 4/1986 | Löfberg | 235/380 |
| 4,588,880 | 5/1986 | Hesser | 235/492 |
| 4,605,844 | 8/1986 | Haggan | 235/380 |
| 4,650,981 | 3/1987 | Foletta | 340/825.33 |
| 4,701,601 | 10/1987 | Francini et al. | 235/492 |
| 4,720,626 | 1/1988 | Nishikawa et al. | 235/492 |
| 4,746,787 | 5/1988 | Suto et al. | 235/379 |

Primary Examiner—A. D. Pellinen
Assistant Examiner—H. L. Williams
Attorney, Agent, or Firm—Robert Louis Finkel

[57] ABSTRACT

A computerized data-bearing card which includes an internal microcomputer chip which includes a random access memory, a read-only memory and a programmable read-only memory, and which is constructed so that digitized data may be read from and written into the microcomputer by an independent reader/writer unit. Communication between the card and the reader/writer unit is by means of interactive photoelectric transducers provided in the card and the reader/writer unit. The circuitry within the card is electrically energized by electromagnetic induction from the reader/writer unit, thereby obviating any need for internal batteries, electrical connections to external power supplies and electric switches. Clock signals from the microcomputer are also supplied to the reader/writer unit by interactive photoelectric transducers.

8 Claims, 2 Drawing Sheets

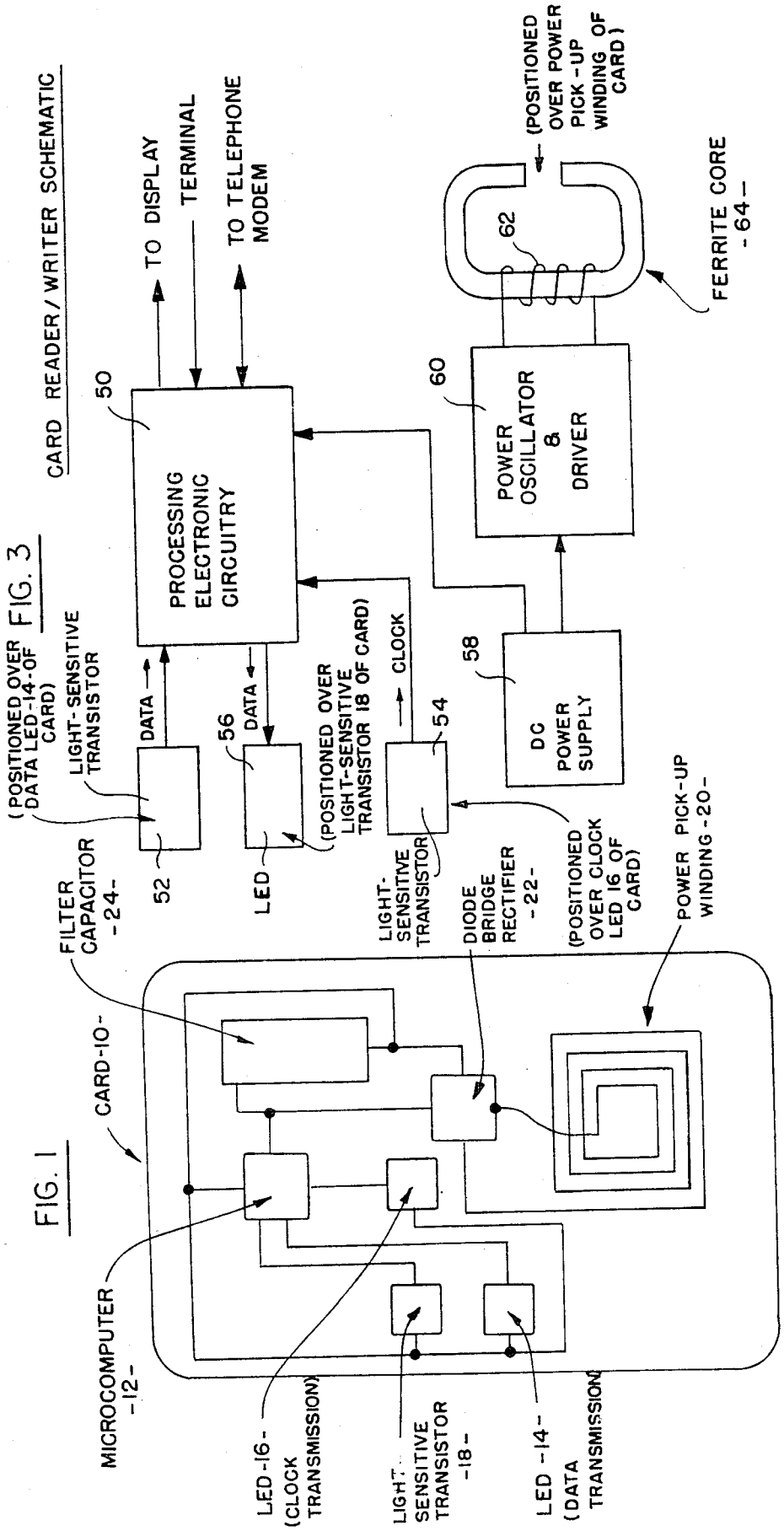

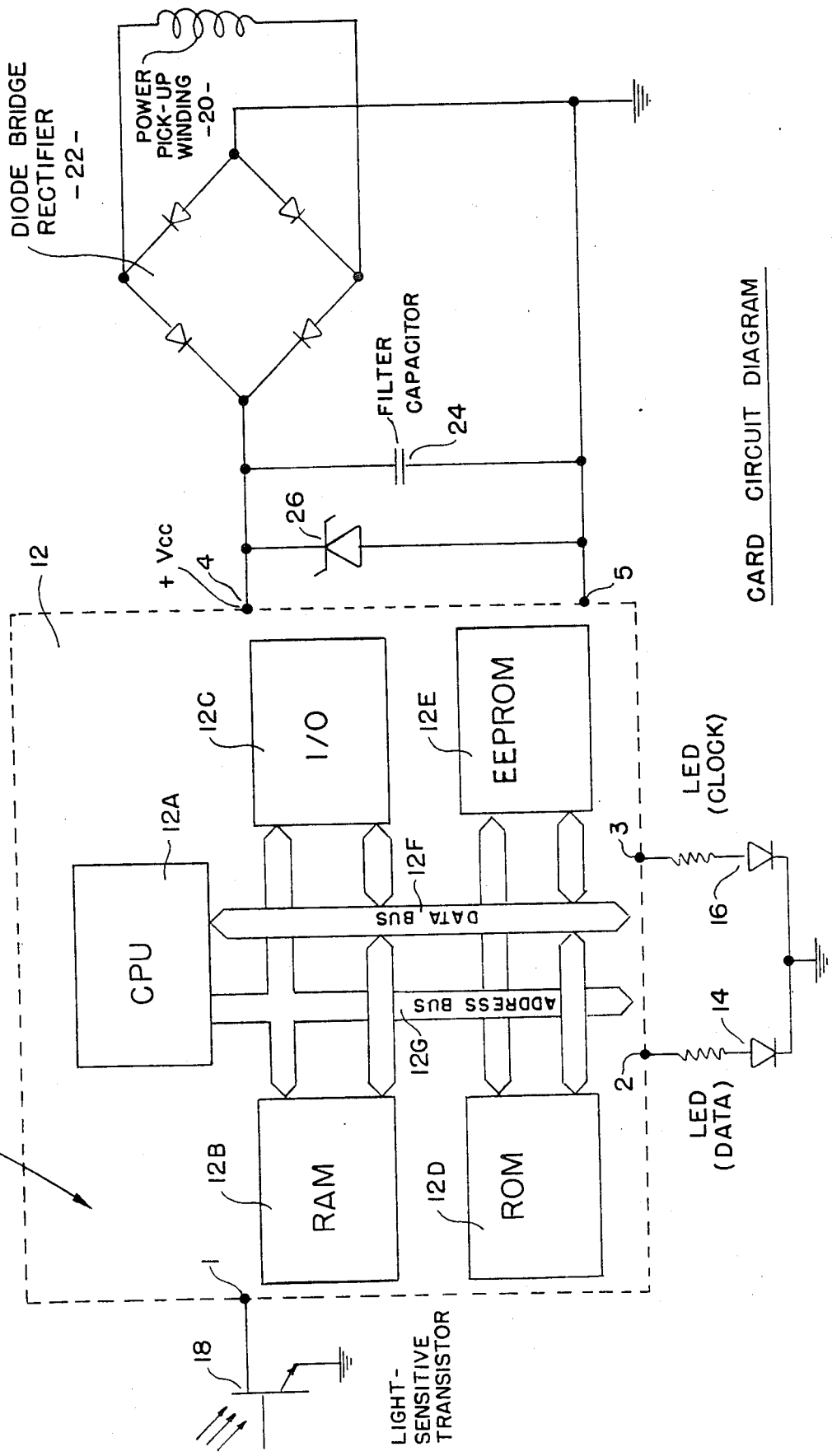

COMPUTERIZED DATA-BEARING CARD AND READER/WRITER THEREFOR

BACKGROUND OF THE INVENTION

1. Field of the Invention

This is a continuation-in-part of my Copending application Ser. No. 936,118, filed Dec. 1, 1986, now abandoned.

This invention relates to personal identification cards, credit cards, and the like, which have embedded within them circuitry, usually including a microcomputer, for storing and processing data and which are adapted to interact with an external apparatus for accessing and modifying data stored in the card. More particularly, it relates to an improved method and means for transferring data between such cards and apparatus.

2. Prior Art

Advances in techniques for microminiaturization of electrical circuitry, and particularly the advent of inexpensive sophisticated microcomputer semiconductor chips, have fanned increasing interest in the development of so called "smart cards." These compact computerized laminated plastic devices have the ability to store and process large amounts of information, and are intended to be used in connection with "reader/writer" terminals adapted to receive, and in some instances alter, delete, or add to, the information contained in the cards' memory. U.S. Pat. Nos. 4,384,288, 4,582,985, and 4,605,844 describe and discuss typical examples of such cards and terminals.

Such cards have the potential for a myriad of applications. As identification cards they may carry biographical data concerning the owner, and other information, such as his employment history and medical, dental, and benefit-entitlement records. Used with specially designed locks, they may serve as pass keys, or as actuators for powered equipment. In conjunction with remotely-linked on-site terminals, they lend themselves to use in banking, mercantile, and various other commercial transactions requiring the information contained in the card to be confirmed, modified, and updated, each time the card is used.

Heretofore, communication between the reader/writer and the computerized data-bearing card has been achieved by direct electrical contact, electromagnetic coupling, or RF transmission. While by and large these methods are adequate, all of them have certain well known inherent deficiencies. My invention avoids many of these drawbacks by utilizing improved methods and means for powering the card and for effecting the exchange of data between the reader/writer terminal and the card.

An objective of the invention is the provision of a computerized card capable of being used for personal identification, data storage and processing, and transaction monitoring, which is wallet size and no thicker than a conventional plastic credit card and can therefore be carried conveniently.

Another objective of the invention is the provision of an improved interactive computerized data-bearing card which requires neither external electrical contacts nor internal batteries.

Still another objective is the provision of computerized data-bearing card and reader/writer therefor which utilize light pulses generated and received by photoelectric transducers, rather than electromagnetic coupling or RF transmission, for the transfer of information to and from the card.

Other objects and advantages will become apparent from the following summary and detailed description of a preferred embodiment of the invention, and its features and operation.

SUMMARY OF THE INVENTION

In its preferred form, the invention comprises a conventional appearing 0.045 to 0.055 inch thick wallet-size plastic card containing among its laminated layers solid state circuitry, including a computer or microprocessor, for receiving, processing, and storing intelligence.

A separate reader/writer communicates with the card in digital code by means of pulses of light. Data from the card are transmitted by a light emitting diode (LED) embedded in the card and are received by a photodetector in the reader/writer. Digitized data, including information to be stored, or used to modify information previously stored in an erasable, alterable programmable memory in the card, are transmitted by a light emitting diode in the reader/writer to a photosensitive detector contained within the card and incorporated in the card's circuitry.

The microcomputer includes means for generating a reference clock signal which is transmitted by a light emitting diode in the card to a photodetector in the reader/writer and which furnishes a control for processing the data signals produced by the card.

To power the microcomputer and other circuitry in the card, a multi-turn secondary winding of wire is embedded within the laminations. A high frequency electromagnetic field provided by a primary winding in the reader/writer induces a voltage in the secondary winding in the card when the card is inserted in an air gap in a magnetic core on the reader/writer, having the primary winding thereon. The high frequency voltage thus induced in the card is rectified, regulated, and used to drive the card circuitry.

DESCRIPTION OF THE DRAWINGS

In the drawings:

FIG. 1 is a schematic representation showing the manner in which the various electrical and electronic elements and components are embedded in a typical credit card embodying my invention;

FIG. 2 is a schematic diagram of the circuitry included in the card of FIG. 1, in accordance with a particular embodiment of the invention; and FIG. 3 is a schematic block diagram of a reader/writer unit which may be used to access data from the card of FIG. 1, or to introduce new data into the card.

DETAILED DESCRIPTION OF THE INVENTION

The computerized data-bearing card of the invention as will be described, takes the form and compact size of a typical plastic credit card. It is intended primarily to be carried in the user's wallet, card case or pocket.

The card is completely self-contained. It requires no batteries and has no exposed terminals, contacts, or connectors. Its circuitry is permanently sealed to the outside environment and is designed to remain operational indefinitely even with heavy use.

The card includes a microcomputer chip which incorporates a read only memory (ROM) capable of containing the microcomputer program, information, such as the card issuer's account-keeping and record-keeping formats, credit processing procedures and merchandise handling methods for use in banking and commercial transactions and the like, and various other types of standardized data.

The chip also includes an electrically alterable, electrically erasable programable read-only memory (EEPROM) which can contain, for example, medical and dental records and other personal information concerning the card owner. The contents of the EEPROM can be accessed as needed and can readily be up-dated, deleted and changed each time the card is used.

The data-bearing card of the invention is designated by the numeral 10 in FIG. 1. A microcomputer 12 is embedded in the card. The microcomputer is connected to a light emitting diode LED 14. A second LED 16 is also connected to the microcomputer 12. Output data signals from the microcomputer 12 are transformed into corresponding light signals by the LED 14. Associated clock signals from microcomputer 12 are transformed into corresponding light clock signals by a second LED 16. A light sensitive transistor 18 is connected to the microcomputer 12. Transistor 18 responds to incoming light signals to introduce corresponding data signals to microcomputer 12.

A multi-turn power pick-up winding 20 is embedded in the card, and a high frequency electromagnetic field is used to induce an alternating current voltage across the winding 20. Winding 20 is connected to a diode bridge rectifier 22, and a filter capacitor 24 is connected across the diode bridge rectifier 22, so that appropriate direct current energizing power may be provided for the microcomputer 12.

The various components of FIG. 1 are illustrated in circuit detail in FIG. 2. As shown in FIG. 2, a Zener diode 26 may be connected across the filter capacitor 24 to serve as a voltage regulator.

The microcomputer 12 may be the type marketed by Hitachi and designated No. HD 65901. As shown in FIG. 2, the microcomputer 12 includes a central processor unit (CPU) 12A, a random access memory (RAM) 12B, appropriate input/output circuitry (I/O) 12C, a read-only memory (ROM) 12D, and an electrically alterable, electrically erasable programmable read-only memory (EEPROM) 12E. The various components described above are interconnected by a data bus 12F and by an address bus 12G. According to usual practice, the program is stored in ROM 12D, and data may be stored in RAM 12B and/or EEPROM 12E.

As is well known, whenever power is lost, solid state random access memory devices, such as RAM 12B, lose all their stored information. The inclusion of EEPROM 12E on the microcomputer chip 12 avoids this problem and enables medical, dental and employment records, personal data, and other information to be stored in the card, as mentioned above, and, more importantly, retained, without the need for a battery. Moreover, the combination of the EEPROM 12E and the other memories in the microcomputer chip decreases the number of internal leads required in the card.

The light sensitive transistor 18 is connected to an appropriate pin 1 of the microcomputer 12, to feed input data signals to the microcomputer 12 in response to light data signals directed at the light sensitive transistor 18. LED 14 is connected to a pin 2 of the microcomputer 12, and responds to output data signals from the microcomputer 12 to generate corresponding light data signals. LED 16 is connected to a pin 3 of the microcomputer 12, and responds to clock signals from the microcomputer 12, discussed more fully below, to produce corresponding light clock signals. The use of phototransducers to effect communication to and from card 10 eliminates the myriad problems associated with external electrical contacts.

The power supply formed by the power pick-up winding 20 and the diode bridge rectifier 22 is connected to a pin 4 of the microcomputer 12 and to a pin 5. Pin 4 is designated $+V_{cc}$, and pin 5 is ground. The illustrated power supply permits power to be provided to the card by an external writer/reader unit across the sealed boundary of the card without requiring external contacts.

The card reader/writer unit is shown in schematic form in FIG. 3. This unit includes internal processing electronic circuitry represented by block 50. A light sensitive transistor 52 is connected to the processing circuitry to supply input data signals to the processing circuitry, and a second light sensitive transistor 54 is connected to the processing circuitry to supply clock signals in response to light clock signals incident on transistor 54. Data signals from the circuitry 50 are applied to a LED 56 to be transformed into corresponding light data signals.

The processing circuitry 50 is powered from a DC power supply 58. Power supply 58 is connected to a power oscillator (and driver) 60 which, in turn, is connected to a winding 62 mounted on a ferrite core 64. Oscillator 60 provides a high frequency output signal in the ultrasonic range to the winding 62. The advantages of using high frequency excitation to power the card circuitry will be discussed below.

Processing circuitry 50 is connected to an appropriate display, so that information read from the data bearing card of FIG. 1 may be interpreted. Also, the circuitry 50 may be connected to an appropriate terminal so that data may be processed to be fed into the card of FIG. 1. In addition, the processing circuitry 50 may be coupled to a telephone line through an appropriate MODEM, so that a remote computer may be used to feed data into the card, and to receive data from the card. The card 10 of FIG. 1, and the reader/writer unit of FIG. 3 are configured so that when the card 10 is inserted into the reader/writer the power pick-up winding 20 is located within the gap of the ferrite core 64, the light sensitive transistor 52 is positioned over LED 14 of the card, the light sensitive transistor 54 is positioned over LED 16 of the card, and the LED 56 is positioned over light sensitive transistor 18 of the card.

In processing the data carried by card 10, insertion of the card 10 into the reader/writer causes the microcomputer 12 within the card 10 to receive power from the power oscillator 16 of the reader/writer unit. Output data from the microcomputer 12 are then sensed by the reader/writer unit by way of light sensitive transistors 52 and 54. Also, new data may be fed into the microcomputer 12 of the card from the processing circuitry 50 by way of LED 56.

When a typical prior art transformer is excited by 60 Hz power, voltages of the order of 0.02V–0.05V are developed across a single turn of the secondary winding 20. With such a transformer, normally more than 60 turns would be required to develop power for a 5 VDC rectifier circuit. In the circuit of FIG. 2, on the other hand, oscillator 60 of the subject invention produces energy in the 10 KHz to 50 KHz range, and preferably in the 15 KHz–20 KHz range, to obtain 0.5–1.5 volts per turn across winding 20 in card 10 of FIG. 1. Accordingly, a winding 20 comprising a thin flat coil of only 4–5 turns will suffice to develop the 5 VDC required by the card.

The foregoing technique uses the air gap in ferrite core 64 of FIG. 3 to serve a current limiting function. This obviates any need for a current limiting resistor within the card, which represents an undesired heat source. The technique also materially reduces the required physical size of filter capacitor 24. The elimination of the limiting resistor permits the regulating Zener diode 26 to be connected directly across the diode bridge rectifier 22.

The internal circuitry of card 10 has an added advantage in that it does not require a standard time based device, such as a quartz crystal. Such crystals require substantial volume, are sensitive to shock, and are easily shattered by bending. The need for the crystal is obviated by feeding the clock output of the microcomputer back to the input with a delay, thus producing a self-oscillating clock circuit.

As shown in FIG. 2, an auxiliary channel is provided to make the nominal clocking and event frequency of the free-running clock generator within microcomputer chip 12 available to the outside environment. This provides a time base against which decoding and encoding may be compared.

It is possible for the computerized card 10 of the invention to be extremely thin. Moreover, the circuitry within the card may be formulated to incorporate no internal solder connections The foregoing may be implemented, for example, by silk screening a conductive circuit pattern on the Mylar substrate, and by the use of a conductive epoxy for establishing connections from the microcomputer chip and other components. To prevent short-circuiting, the epoxy is silk screened over the conductive circuit pattern using a mask.

The invention provides a simple and inexpensive data carrying credit card and reader/writer unit. Since it does not have any external electrical contacts or internal batteries, the card need be no larger than existing conventional credit cards and thus may be carried conveniently. The compact reader/writer unit allows the data on the card to be processed locally, or from a remote terminal.

Although I have described the invention in terms of a preferred embodiment with several specific features, it is not to be construed as limited to that embodiment and those features. They are to be regarded as illustrative rather than restrictive. It is my intention by this specification to include any and all variations of the examples I have chosen for purposes of the disclosure, which do not depart from the spirit and scope of the following claims.

I claim:

1. In combination, a computerized data-bearing card and a read/writer unit, comprising:
   a thin card-like member insertable into said reader/writer unit and containing microcomputer means;
   first electrical-light transducer means mounted on said card-like member and connected to said microcomputer means for converting electrical output signals from said microcomputer means into light signals for introduction into the reader/writer unit, said first electrical-light transducer means including a first transducer for converting electrical data signals from said microcomputer means into corresponding light data signals and a second transducer for converting electrical clock signals from said microcomputer means into corresponding light clock signals;
   electrical signal processing means included in said reader/writer unit;
   first light-electrical transducer means mounted on said reader/writer unit and responsive to light signals from said first electrical-light transducer means for introducing electrical input signals to said electrical signal processing means;
   second electrical-light transducer means mounted on said reader/writer unit and connected to said electric signal processing means for converting electrical output signals from said electrical signal processing means into light signals;
   second light-electrical transducer means mounted on said card-like member connected to said microcomputer means and responsive to light signals from said second light-electrical transducer means for introducing for introducing electrical input signals to said microcomputer means;
   power supply means mounted on said card-like member for supplying power for said micromputer means and including a first power transfer winding embedded in said card-like member, a diode bridge rectifier embedded in said card-like member, and a Zener diode connected directly across said diode bridge rectifier to regulate the output from said power supply;
   an oscillator mounted on said reader/wreiter unit for generating an alternating current electric power signal of a predetermined frequency;
   a second power transfer winding mounted on said reader/writer unit and connected to said oscillator; and
   a magnetic core mounted on said reader/writer unit for supporting said second winding, said core having an air gap therein for receiving said card-like member and adapted to produce a magnetic field in said air gap for generating current in said first winding to produce power for said microcomputer means when said first winding is inserted into the air gap.

2. The combination defined in claim 1, in which said first and second light-electrical transducer means each comprises at least one light-sensitive transistor.

3. The combination defined in claim 1, in which said first and second electrical-light transducer means each comprises at least one light emitting diode.

4. The combination defined in claim 2, in which said first and second electrical-light transducer means each comprises at least one light emitting diode.

5. A portable computerized data-bearing device containing information relating to the owner, comprising:
   a thin card-like member capable of being conveniently carried by the owner in a wallet, or the like;
   a microcomputer embedded in said card-like member and including a central processing unit and memory means connected to said central processing unit, said memory means including a random access memory for storing data which are lost when the microcomputer is de-energized, a read-only memory for storing the program for the central processing unit and other standardized data relating to the owner and a programmable read-only memory for storing additional data relating to the owner, the data stored in the read-only memory and in the programmable read-only memory being retained therein when the microcomputer is de-energized;

photoelectric transducer means mounted on aid card-like member and connected to said microcomputer and responsive to light signals incident thereon for introducing electric input signals to said microcomputer;

electro-phototransducer means mounted on said card-like member and connected to said microcomputer and responsive to electric output signals from said microcomputer for generating corresponding light output signals, said electro-phototransducer means including a first electro-phototransducer connected to said microcomputer and responsive to electrical data output signals from said microcomputer for generating data light output signals from said microcomputer for generating clock light output signals;

power supply means connected to said microcomputer and including a power transfer winding embedded in said card-like member, said power supply means being normally passive and normally establishing the microcomputer in a de-energized state, but said power supply means being responsive to an external magnetic field for generating electric power for said microcomputer only in the presence of said magnetic field, said power supply means including a diode bridge rectifier embedded in said card-like member and a Zener diode connected directly across said diode bridge rectifier to regulate the output from said power supply.

6. The computerized data-bearing device set forth in claim 5, in which said photoelectric transducer means comprises at least one light sensitive transistor.

7. The computerized data-bearing device set forth in claim 5, in which said electro-phototransducer means comprises at least one light emitting diode.

8. The computerized data-bearing device set forth in claim 6, in which said electro-phototransducer means comprises at least one light emitting diode.

* * * * *